(12) United States Patent
Bachman

(10) Patent No.: US 10,328,822 B2
(45) Date of Patent: Jun. 25, 2019

(54) ADJUSTABLE SEAT AND SUPPORT SYSTEM

(71) Applicant: Eugene Edward Bachman, Columbus, MI (US)

(72) Inventor: Eugene Edward Bachman, Columbus, MI (US)

(*) Notice: Subject to any disclaimer, the term of this patent is extended or adjusted under 35 U.S.C. 154(b) by 0 days.

(21) Appl. No.: 13/901,568

(22) Filed: May 24, 2013

(65) Prior Publication Data

US 2014/0346822 A1 Nov. 27, 2014
US 2015/0069801 A9 Mar. 12, 2015

Related U.S. Application Data

(60) Provisional application No. 61/650,956, filed on May 23, 2012.

(51) Int. Cl.
| | |
|---|---|
| *B60N 2/02* | (2006.01) |
| *B60N 2/16* | (2006.01) |
| *B60N 2/18* | (2006.01) |
| *B60N 2/24* | (2006.01) |
| *B62K 5/01* | (2013.01) |
| *B62J 1/02* | (2006.01) |

(52) U.S. Cl.
CPC ............ *B60N 2/02* (2013.01); *B60N 2/1615* (2013.01); *B60N 2/1625* (2013.01); *B60N 2/1821* (2013.01); *B60N 2/1825* (2013.01); *B60N 2/24* (2013.01); *B62J 1/02* (2013.01); *B62K 5/01* (2013.01)

(58) Field of Classification Search
CPC ...... B60N 2/02; B60N 2/1615; B60N 2/1625; B60N 2/1821; B60N 2/24; B62K 5/01; B62J 1/02
USPC ............................................. 296/65.01, 65.02
See application file for complete search history.

(56) References Cited

U.S. PATENT DOCUMENTS

| | | | | |
|---|---|---|---|---|
| 6,773,049 | B2* | 8/2004 | Rupiper et al. ................. | 296/63 |
| 8,973,967 | B2* | 3/2015 | Kolb ...................... | B60N 2/502 |
| | | | | 296/65.02 |

* cited by examiner

*Primary Examiner* — Glenn Dayoan
*Assistant Examiner* — Melissa A Black
(74) *Attorney, Agent, or Firm* — Cargill & Associates, PLLC; Lynn E. Cargill

(57) ABSTRACT

An improved system to raise and lower a seat by a simplified substantially parallelogram or non-parallelogram motion. By replacing two of the links of a parallelogram seat lift system with an arc, or a straight link as a mechanically defined path for a pivot to follow, space and material can be saved to fit an adjustable seat on an ATV or any type of support system. The system can be useful on many varieties of vehicles and other adjustable supports.

9 Claims, 9 Drawing Sheets

PRIOR ART

Prior Art

ADJUSTABLE SEAT AND SUPPORT SYSTEM

CROSS REFERENCES TO RELATED APPLICATIONS

This application claims the benefit of U.S. provisional application No. 61/650,956 filed on May 23, 2012.

FIELD OF INVENTION

This invention relates generally to adjustable seat support systems for 4 wheel straddle seat vehicles and seats of various types and other support devices.

BACKGROUND OF THE INVENTION

Typically an all terrain vehicle, know as an ATV, is a motorized vehicle having three or four low pressure tires, a seat the operator's legs straddle, and handlebars for steering control. ATVs are used for work, recreation and various types of competition, mostly off road. There are over 10 million ATVs in use in the United States (US) and they are typically much less expensive and smaller than a car.

Though useful, ATVs have proven to be dangerous. The rider position is usually seated on top of the vehicle and contributes to a higher center of gravity and makes him more likely to be thrown from the vehicle. The higher center of gravity contributes to rolling the vehicle especially when cornering, accelerating, braking, or on uneven terrain.

The US Government Accountability Office (GAO) estimated in a recent report that there are about 400,000 injuries and 800 deaths result from ATV accidents in the average year. In FIG. 1 from that report, the GAO illustrates how typical ATV fatalities and injuries occur. Four or five of the scenarios they show involve rolling the vehicle or being thrown from it. A high seat position can contribute to accident or injury cause in four of the scenarios shown.

A purpose of an adjustable seat and support system is to give an ATV rider the option of lowering the seat of an ATV, therefore lowering the center of gravity, plus making him or her more one with the vehicle and less likely to roll or be ejected.

Additionally, the cost of automobiles continues to escalate each year and the price of fuel is unstable. Global weather change has everyone concerned about carbon footprint. The world economy is swelling and many millions of people would like to find affordable 4 wheel transportation for good and bad roads. A small on and off the road 4 wheel vehicle with a straddle seat and handlebars, that is safe from rollovers and driver ejection, is not known or common. With the adjustable seat and support system and some design changes to an ATV, a useful vehicle could be created that could:
  Have fuel economy easily over 50 miles per gallon
  Reduce the carbon footprint
  Be purchased for half the cost of an automobile
  Open the market for future luxury models, designed for current luxury motorcycle riders who would like 4 wheels and the feel of a motorcycle
  Help millions in developing countries and across the world get affordable 4 wheel transportation that will be safe and useable on all their roads The current design of seats and supports shows little or no use of the architecture and geometry used in the adjustable seat and support system. This invention can offer many advantages that will be shown to be useful in many different seat applications as well as many devices used to support, lift and move objects.

SUMMARY

A support adjustment system used to lift an object in parallelogram motion or non-parallelogram motion using a rail and two links.

DETAILED DESCRIPTION

Seats are known to be adjustable in many ways. One way commonly known to move a seat horizontally and vertically simultaneously is to use geometry often referred to as a parallelogram.

Figure 1:
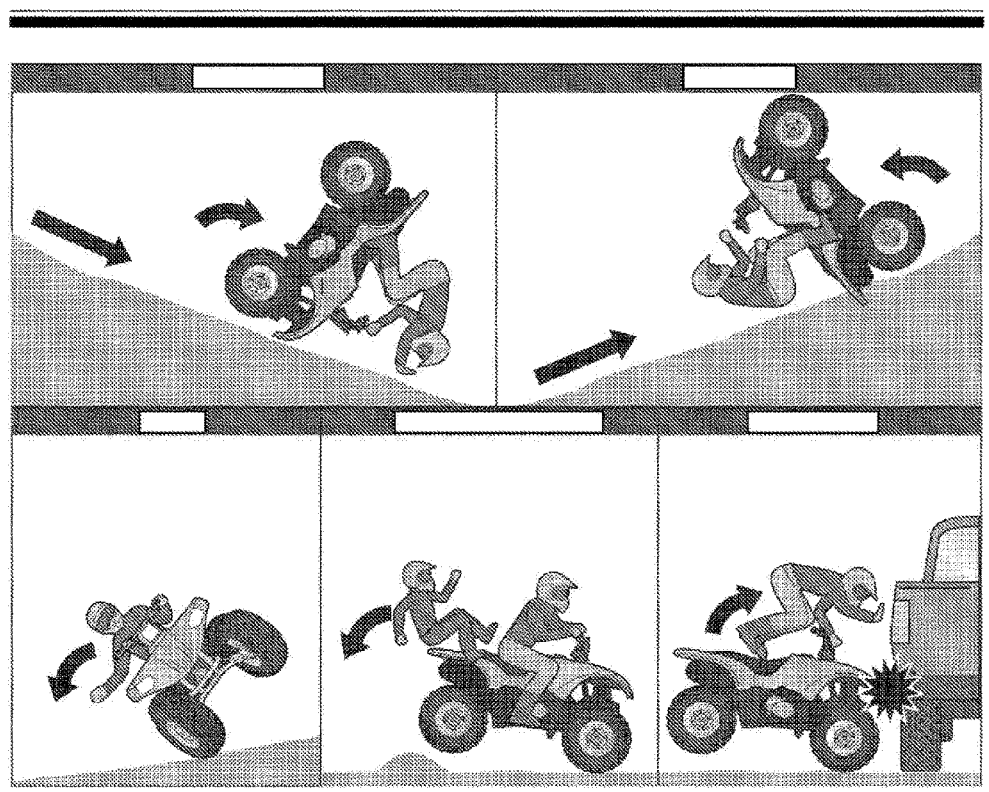
FIG. 1 Prior Art
FIG. 2 Prior Art
FIG. 3 First aspect with the seat at the lowest position and parallelogram marked
FIG. 4 First aspect with the seat at the lowest position and parallelogram movement
FIG. 5 Elevated view of the seat assembly with seat at its lowest position.
Figure 2:
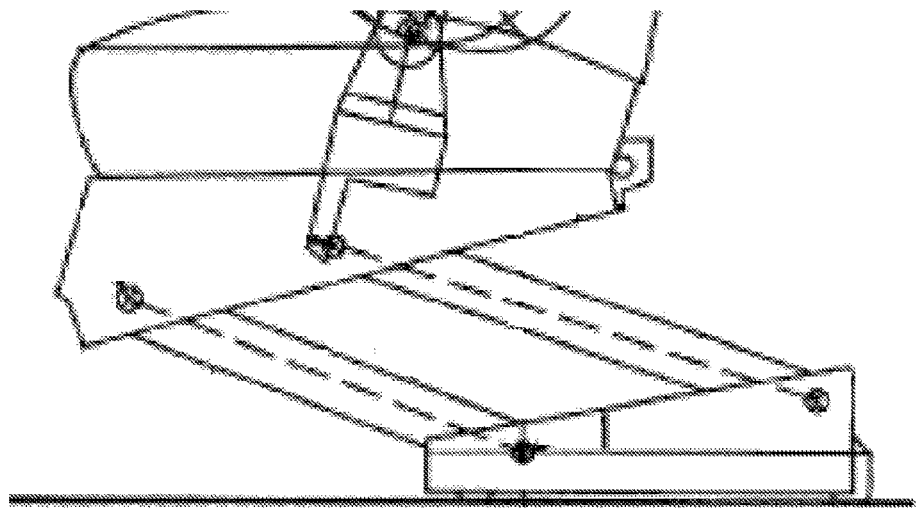
Figure 3:
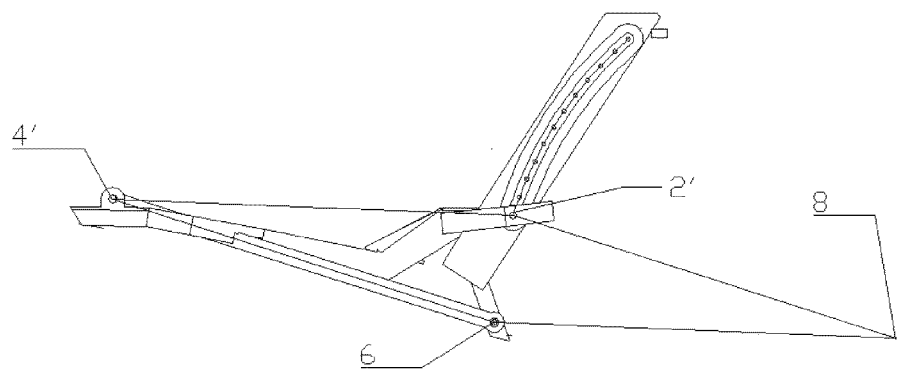

The parallelogram has two sets of opposite, parallel and equal sides. If the sides are of fixed length and the sides can pivot at their connecting points, and one of the 4 sides is fixed in place when one of the other sides is moved, all three of the unfixed sides move and stay parallel to their opposite sides. If the side opposite the fixed is a surface used to support a seat or other object, then when it moves it stays in parallel with the plane occupied by the fixed side. Typically this means there are 4 visible links in a parallelogram like seat suspension method as shown in U.S. Pat. No. 6,354,556, see FIG. 2.

Some aspects of the invention involve a new use of this old geometry, the parallelogram. This aspect starts with 4 sided geometry and two sets of opposite, parallel and equal sides. One of the sides is fixed in place and all sides are of fixed length. The fixed side and one adjacent side are not typically visible. They are connected to and/or part of a circular arc that is visible. Said arc is fixed in place. The fixed side is a fixed invisible line from the center of curvature of said arc (which is the invisible fixed pivot point 8) to the lower pivot (which is the visible fixed pivot point 6) on a moveable upright link. The other hidden moveable line is a radius line that runs from the center of curvature of said arc, said invisible fixed pivot point 8, to the arc at a pivot and follow point 2' at one end of the seat. A line, a support surface line, that runs from said pivot and follow point 2' at one end of the seat to a pivot point four 4', at the other end of the seat is the side that is equal in length and parallel to said fixed invisible line. A line from said pivot point four 4' runs through said moveable upright link to said visible fixed pivot point 6 and is of equal length and parallel to said radius line. As said pivot and follow point 2' is moved along said arc, said support surface line is moved simultaneously horizontally and vertically along said arc. Because of the parallelogram like movement, said support surface line stays in parallel to its original position and said fixed side.

Figure 4:
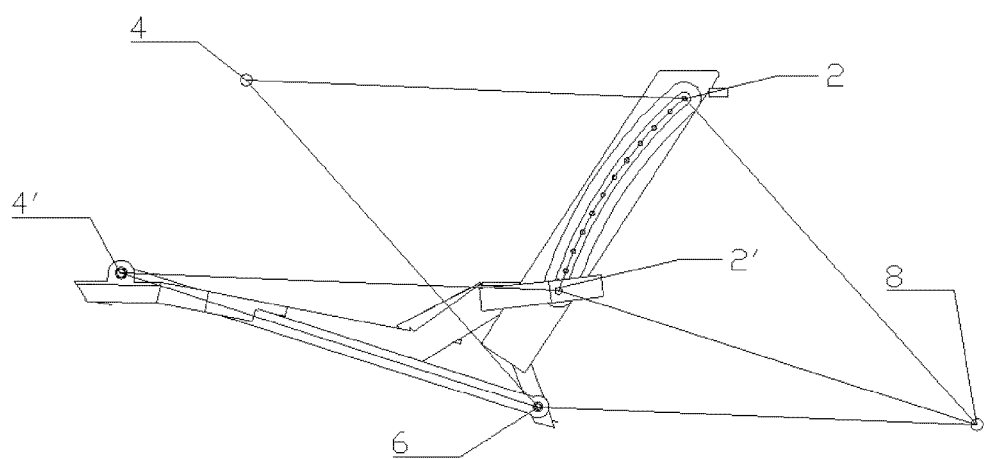
Figure 5:
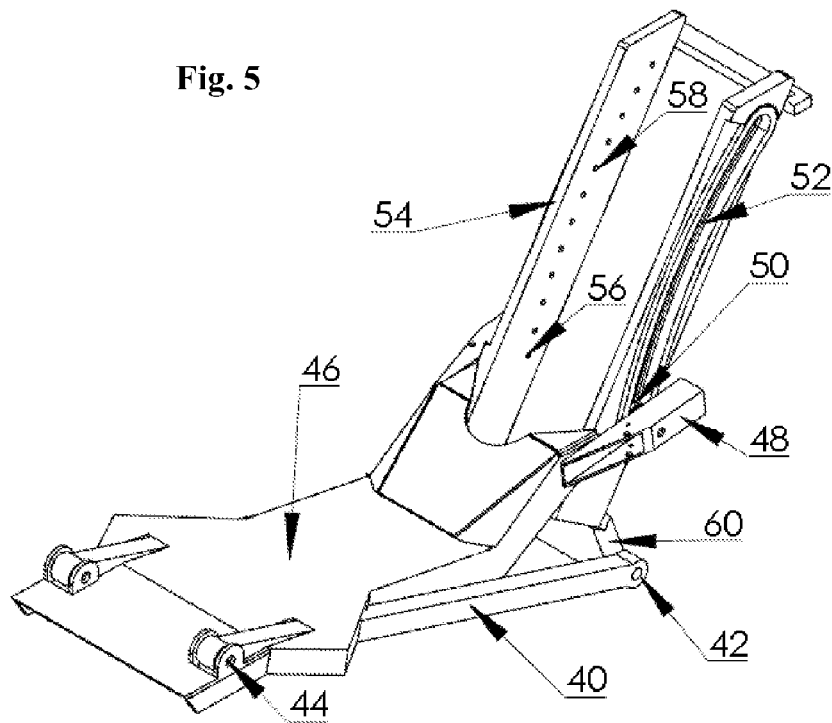

In FIG. 4 the lines and pivot points are seen in the lower and upper positions on said arc. As can be seen in this Fig., the seat will move in parallelogram like motion to the high position and stay parallel to its original position.

All lines mentioned above and below are straight unless specified otherwise, and equal length is to be interpreted as of substantially equal length. Parallel is to be interpreted as substantially parallel.

The following parts and features have substantially mirrored image parts or features on the right and left side of this sub-assembly: rear support arm 40, support lower pivot 42, support upper pivot 44, pan to follower bracket 48, track follower roller 50, seat track 52, seat track side frame 54, latch pin 56 and latch pin holes 58.

The seat track side frame 54 is rigidly mounted to the ATV frame. Seat track side frame 54 may be a section of the ATV frame. In this document "the ATV frame" will refer to the tubular or solid frame that substantially runs around the outside of the center portion of the ATV. The ATV frame runs from front to rear typically very near the lowest point, of the ATV, then upward at some angle or curve to above the engine, over the top of the engine for some distance, and then down again to the bottom of the ATV. Some ATV frames do not completely go above the engine but have two frame portions at the left and right sides near the top of the engine. This is not intended to give an exhaustive description of all ATV frames but just a typical description of where to locate a seat. Track side frame 54 is part of or attached to an ATV frame and to locate parts and features mentioned later. The top of seat track side frame 54 is attached at a plane near to the top of ATV frame, typically above the transmission portion of the engine/transmission. Seat track side frame 54 runs at an angle toward the rear and bottom of the ATV. The bottom of seat track side frame 54 is attached rigidly to the ATV frame near the bottom, system mounting frame 32 or lower seat frame 60. Seat track 52 and latch pin holes 58 are formed by any means effective or cut into seat track side frame 54. Latch pin holes 58 run in a pattern substantially down the center of seat track 52.

Track follower roller 50 has a diameter that is slightly smaller than the width of seat track 52. Track follower roller 50 is rotatably attached to pan to follower bracket 48 in such a way as to force said roller to follow seat track 52. Pan to follower bracket 48 is rigidly attached to a front portion of support pan 46. Rear support arm 40 is pivotally attached to a rear portion of support pan 46 at support upper pivot 44. The other end of rear support arm 40 is pivotally attached to lower seat frame 60 or a lower portion of the ATV frame or a suitable attachment to system mounting frame 32 at support lower pivot 42.

Figure 6:
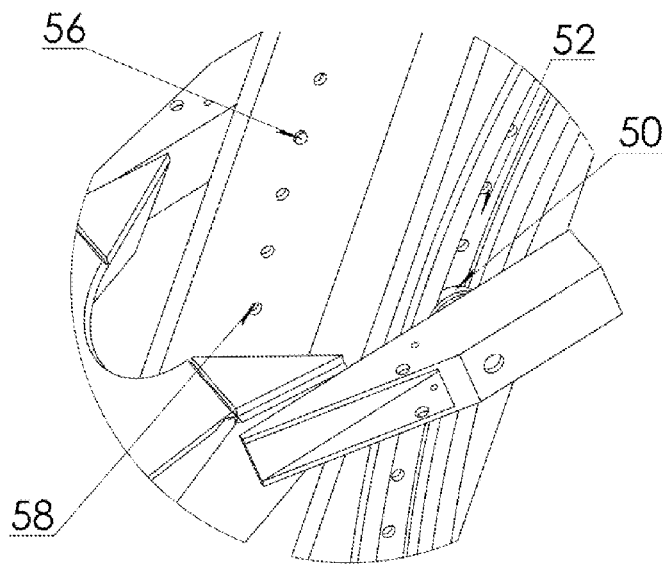
FIG. 6 Close-up view of the seat assembly in a middle latched position to show the track, roller, latch pin and latch holes.
Figure 7:
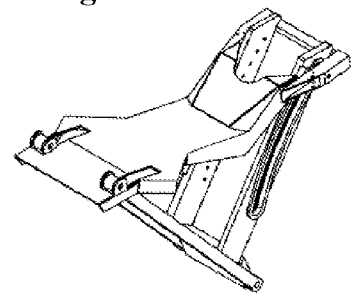
FIG. 7 Seat assembly with the seat latched in the highest position.
Figure 8:
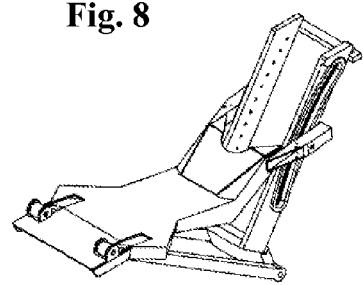
FIG. 8 Seat assembly with the seat latched in a middle height position.
Figure 9:
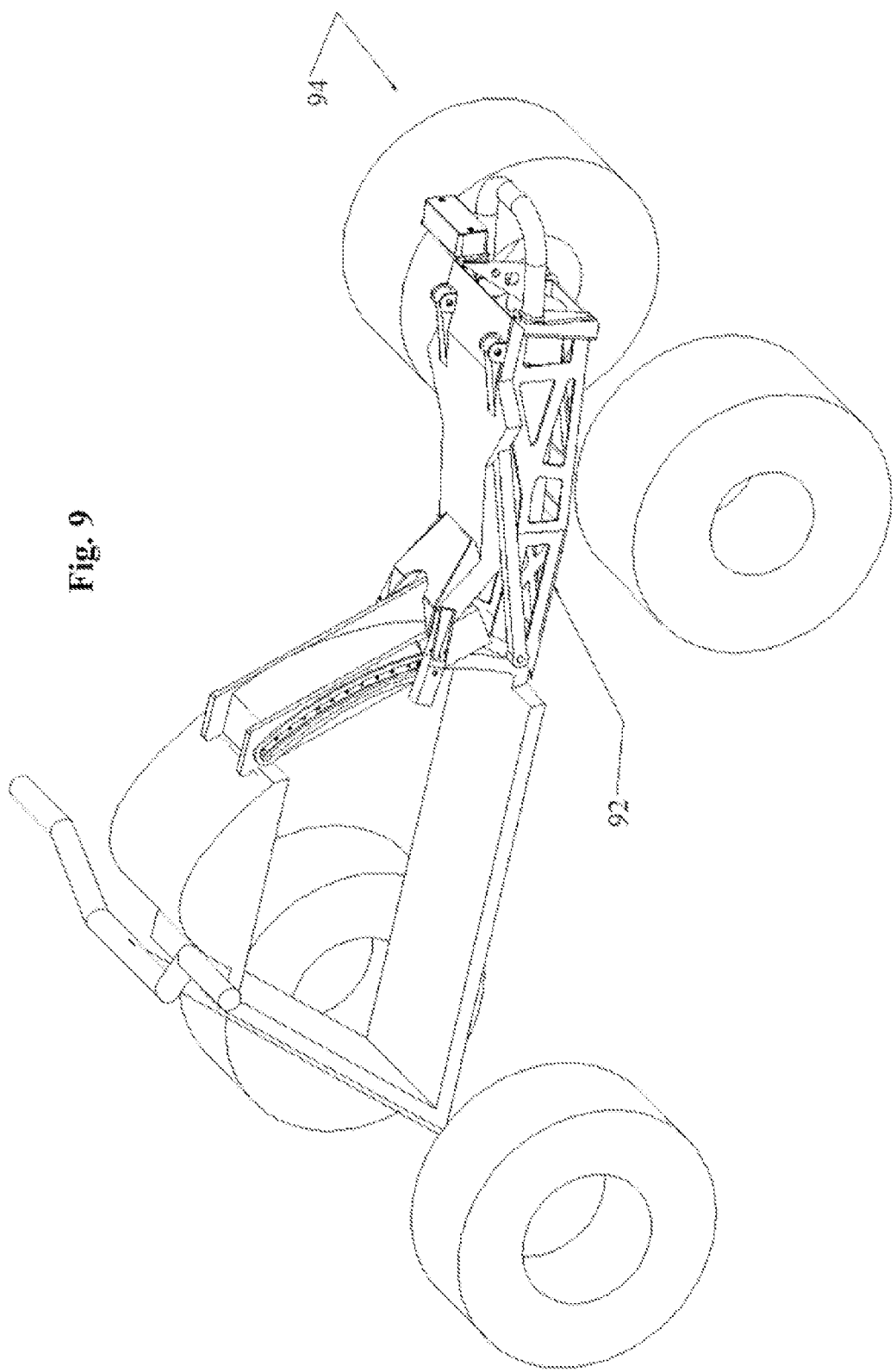
FIG. 9 Seat assembly mounted on an ATV
FIG. 10 Second aspect with a single slide rail
FIG. 11 Close up of slide pivot and magnet latch assembly
FIG. 12 Orthographic view of second aspect with parallelogram lines
FIG. 13 Non-parallelogram motion using a straight line instead of a circular arc

FIG. 8 is a view of the seat sub-assembly with the seat latched in a middle height position. FIG. 7 is a view of the seat sub-assembly with the seat latched in the highest position. FIG. 6 is a close-up view of a portion of seat sub-assembly 4. Latch pin 56 is mounted so it can slide in and out on the center line of track follower roller 50. To latch, the seat height position latch pin 56 is forced or moved by a spring into a latch pin hole 58. To unlatch, the seat height latch pin 56 is forced out of or moved out by a spring of latch pin hole 58. Many means are known of pulling or pushing a pin in or out of a hole and are not shown here.

The support pan 46 can be moved up or down to any position on the seat track or latched in any of the position made available by latch pin poles 58. There can be any number of latch pin holes 58. Latchpin holes 58 may or may not go all the way thru seat track side frame 54.

Figure 10:
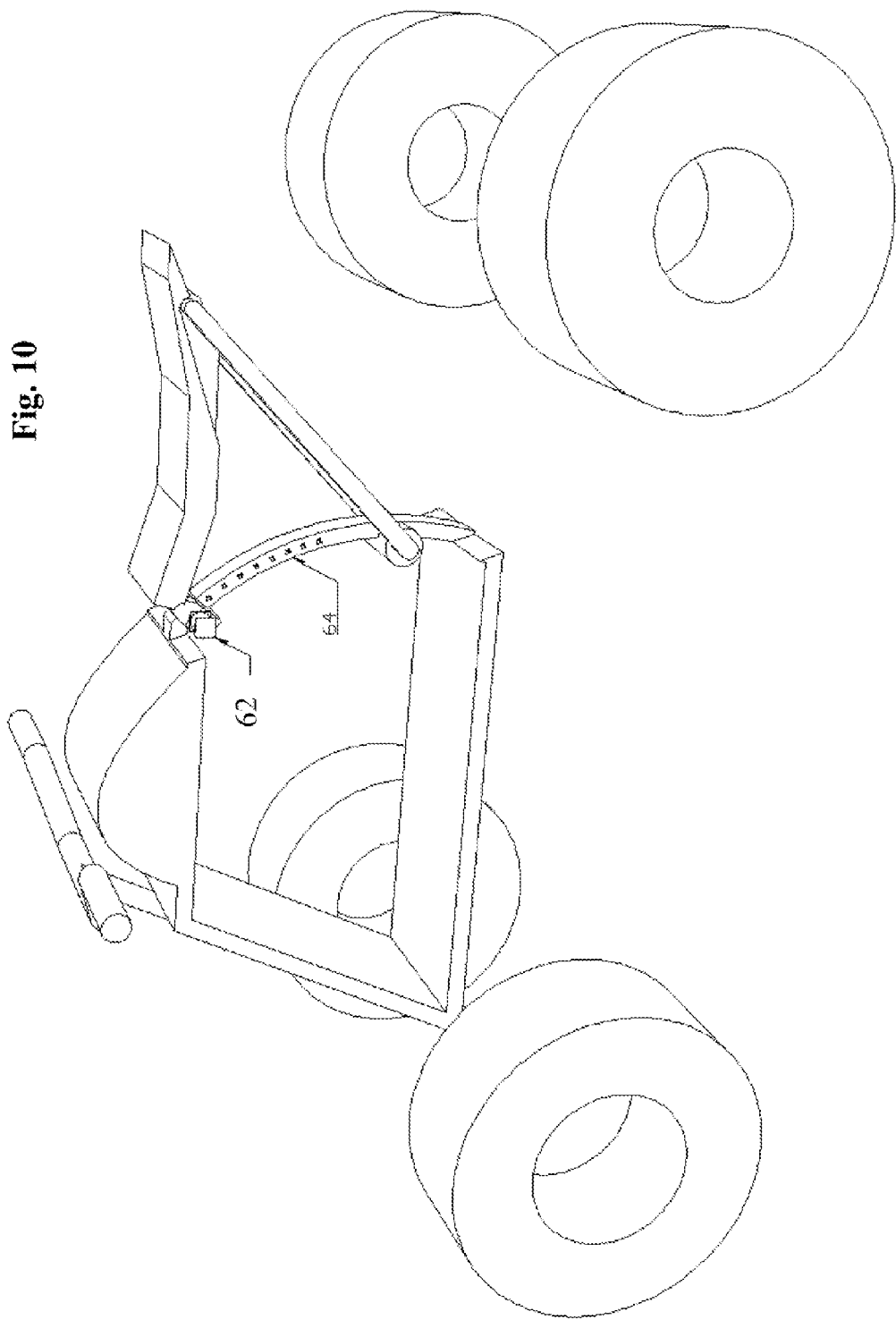

FIG. 10 is a view of a second aspect with a single slide rail. Shown is an aspect of the adjustable seat and support system with a single rail that is part of the frame of an ATV. The seat is at the top position on the rail.

Figure 11:
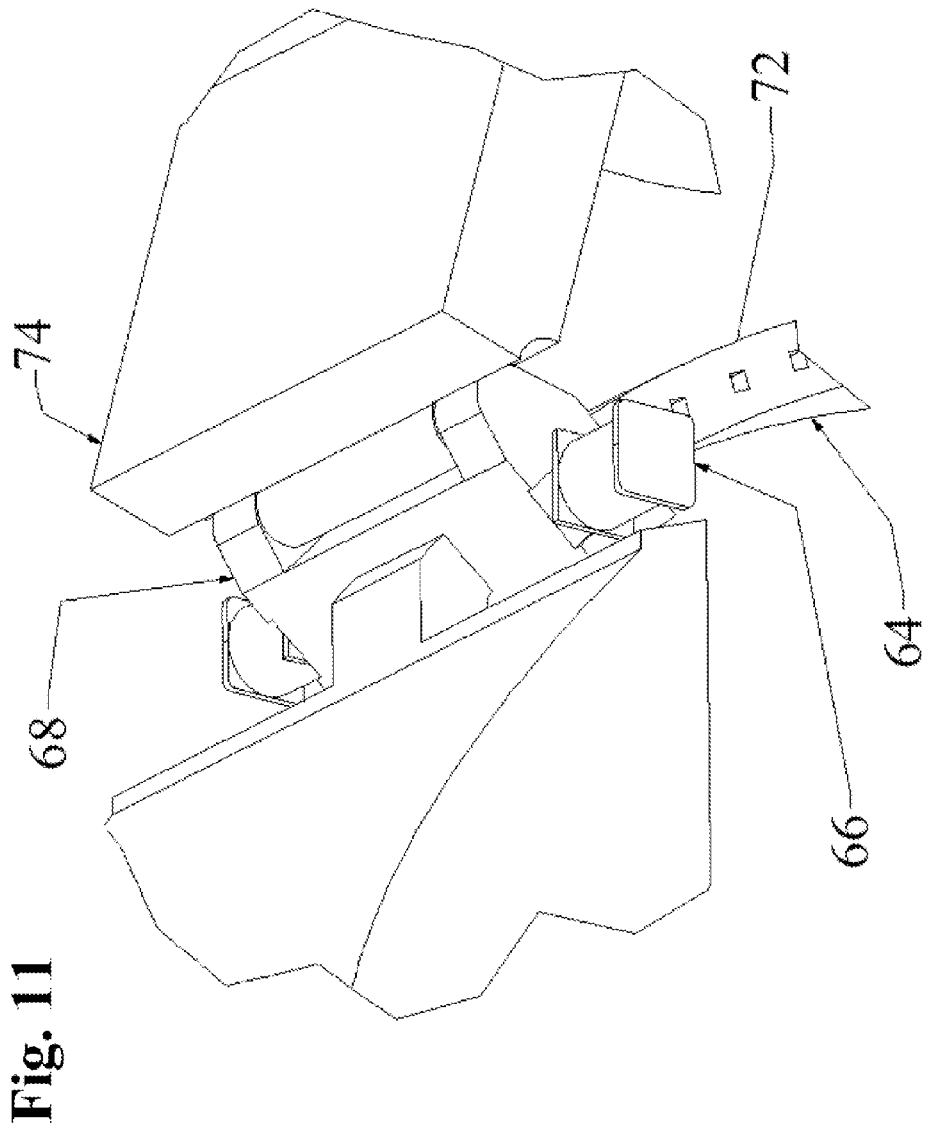
Figure 12:
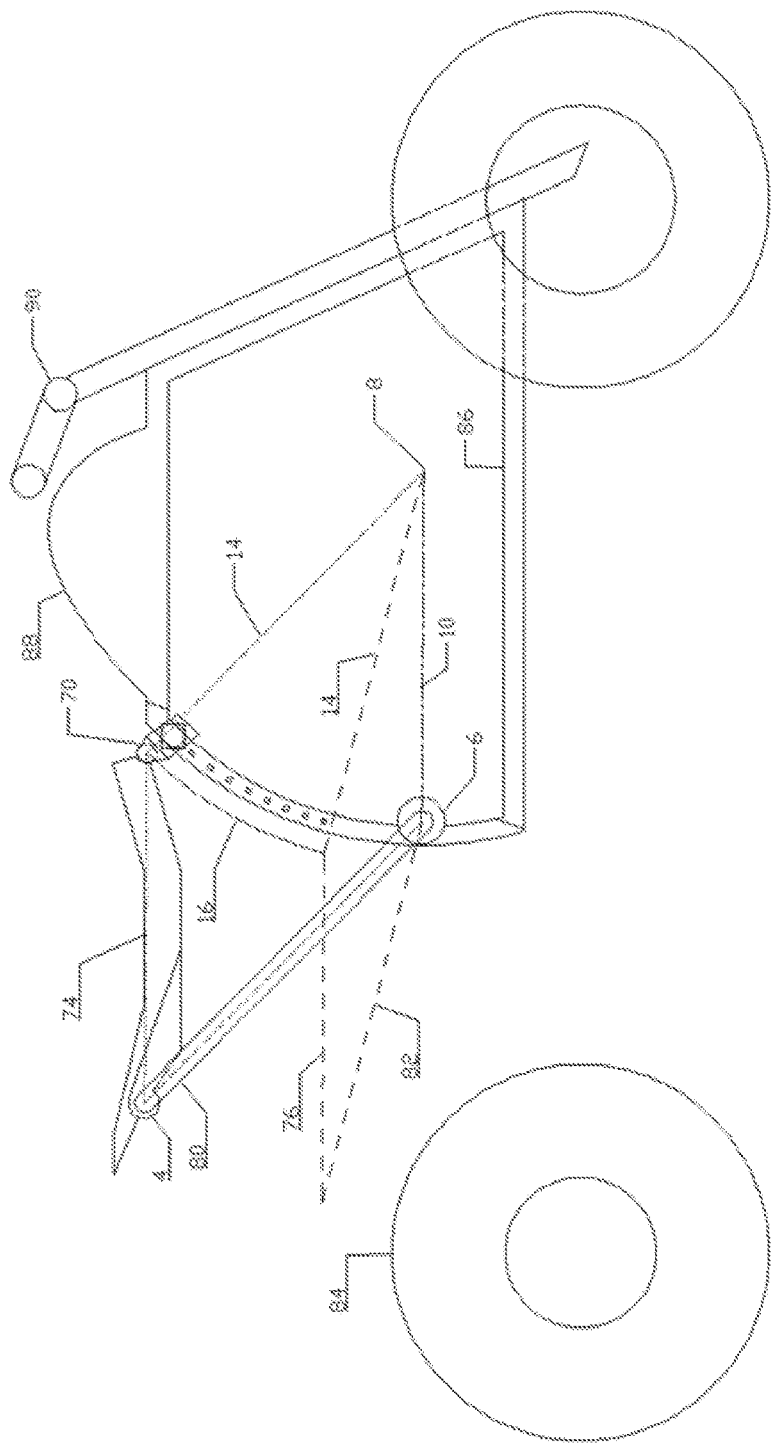

FIG. 12 is an orthographic view of said second aspect with parallelogram lines showing the movement of the seat. A slide pivot and magnetic latch assembly 62 moves slidably along slide and latch rail 64 and causes a pivot point at the front of the seat 70 to follow the arc as shown. Said pivot point pivotably attaches the seat 74 to said slide pivot and magnetic latch assembly. Square latch pins are urged into the square apertures on said slide and latch rail 64 to hold seat position. Electromagnetic latch pulls 66 shown in FIG. 11 pull the square pins from their apertures and allow the rider to adjust the seat position at the push of a button. Behind covers at visible fixed pivot point 6 there are springs that have just enough tension to cause the seat to rise to the highest position. For the rider to change the position of the seat, a selection button is pushed and held until desired position is reached.

Figure 13:
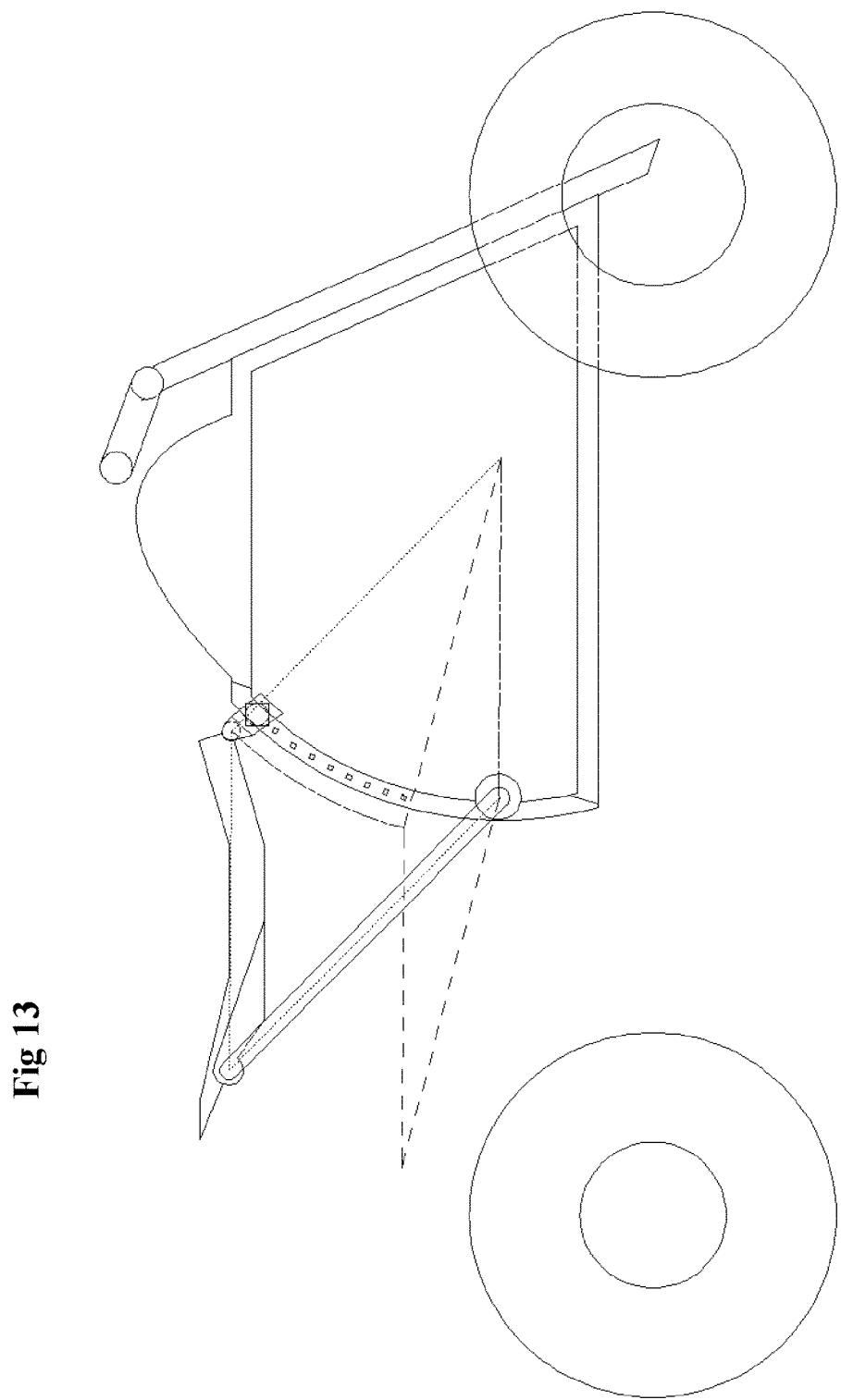

FIG. 13 is a view of non-parallelogram motion using a straight line instead of a circular arc as a third aspect of this invention. When a straight line is used, the movement of the seat deviates significantly from the movement of a parallelogram. When a straight line is used for the rail, the back of the seat pitches up significantly as the seat moves down, in this movement about 12 degrees. This can be useful on an ATV or any straddle seat vehicle that uses one set of foot pegs slightly forward of the rider. As the seat goes down, the legs of the rider tend to fold up under him, pushing him or her away from the handle bars. When the back of the seat pitches up, it tends to cause the rider to move forward, helping the rider compensate for the folded legs.

Thus the reader will see that at least, an aspect of the adjustable support and seat system provides many advantages including but not limited to:
 Space, weight and material saved
 Simplified design
 Greater rigidity
 Easier to index positions
 While the above description contains many specificities, they should not be construed as limitations of the scope, but rather, as an exemplification of one or several aspects there of. Many other variations are possible.

Accordingly, the scope should be determined not by the aspects illustrated, but by the appended claims and their legal equivalents.

LIST OF REFERENCE NUMBERS USED IN DRAWINGS

2 Pivot and follow point
4 Pivot point four
6 Visible fixed pivot point
8 Invisible fixed pivot point
10 Fixed invisible line
14 Invisible radius line 16 Arc
40 Rear support arm
42 Support lower pivot
44 Support upper pivot
46 Support pan
48 Pan to follower bracket
50 Track follower roller
52 Seat track
54 Seat track frame
56 Latch pin
58 Latch pin holes
60 Lower seat frame
62 Slide pivot and magnetic latch assembly
64 Slide and latch rail
66 Electromagnetic latch pulls
68 Slide and pivot block with internal rollers
70 Pivot point at front of seat
72 Square latch holes
74 Seat
76 Seat position at lowest latch
78 Seat front pivot
80 Rear support link
82 Position of rear support link when seat at lowest latch
84 Tires
86 Vehicle frame
88 Fuel tank
90 Handlebars
92 Muffler and protection bracket
94 Taillight grab bar

I claim:

1. An adjustable seat and support system using substantially parallelogram movement for moving the seat and support system horizontally and vertically simultaneously to adjust the position and relocate the center of gravity of said adjustable seat and support system, comprising:
a rail defining a substantially circular arc; and
two support links having substantially fixed lengths;
said rail and two links being connected by three pivot points on three rotatable mechanical axes (2,4,6), one axis (6) which is at a fixed point and one of the other axes (2) following at least one circular arc defined by the rail having a center of radius, along with the third axis (4) connecting the two support links;
said adjustable seat and support system being capable of a substantially parallelogram like movement with the rail and two support links connected by only the three rotatable mechanical axes,
whereby said adjustable seat and support system moving in a substantially parallelogram like movement is capable of moving horizontally and vertically simultaneously by following the arc defined by the rail to adjust the position of the adjustable seat and support system resulting in a relocation of the center of gravity.

2. The adjustable seat and support system of claim 1, further including a spring to urge the adjustable seat and support system to a desired position.

3. The adjustable seat and support system of claim 1, further including a latch assembly to cause said adjustable seat and support system to be supported, limiting movement.

4. The adjustable seat and support system of claim 1, further comprising an electromagnetic latch assembly.

5. An adjustable seat and support system using a substantially non-parallelogram movement for moving the seat and support system horizontally and vertically simultaneously to adjust the position of said adjustable seat and support system, comprising:
a rail defining a path of movement; and
two support links having substantially fixed lengths;
said rail and two links being connected by three pivot points on three rotatable mechanical axes (2,4,6), one axis (6) which is at a fixed point and one of the other axes (2) following the path of movement defined by the rail, along with the third axis (4) connecting the two support links,
said support system being capable of a substantially non-parallelogram like movement with the rail and two support links connected by only the three rotatable mechanical axes,
whereby said adjustable seat and support system moving in a substantially non-parallelogram like movement is capable of moving horizontally and vertically simultaneously by following the path of movement defined by the rail to adjust the position of the adjustable seat and support system, resulting in a relocation of the center of gravity.

6. The adjustable seat and support system of claim 5, further including a spring integral with the seat to urge said adjustable seat and support system to a desired position.

7. The adjustable seat and support system of claim 5, further including a latch assembly to cause said adjustable seat and support system, limiting movement.

8. The adjustable seat and support system of claim 5, further comprising an electromagnetic latch assembly.

9. An adjustable seat and support system using parallelogram movement for moving the seat and support system horizontally and vertically simultaneously to adjust the position and relocate the center of gravity of said adjustable seat and support system, comprising:
a rail defining a circular arc;
two support links having substantially fixed lengths;
a spring integral with the seat to urge the adjustable seat and support system to a desired position; and
a latch assembly to cause said adjustable seat and support system to experience limited movement,
said rail and two links being connected by three pivot points on three rotatable mechanical axes (2,4,6), one axis (6) which is at a fixed point and one of the other axes (2) following at least one circular arc defined by the rail having a center of radius, along with the third axis (4) connecting the two support links;
said adjustable seat and support system being capable of a substantially parallelogram like movement with the rail and two support links connected by only the three rotatable mechanical axes,
whereby said adjustable seat and support system moving in a parallelogram like movement is capable of moving horizontally and vertically simultaneously by following the arc defined by the rail to adjust the position of the adjustable seat and support system, resulting in a relocation of the center of gravity.

* * * * *